UNITED STATES PATENT OFFICE.

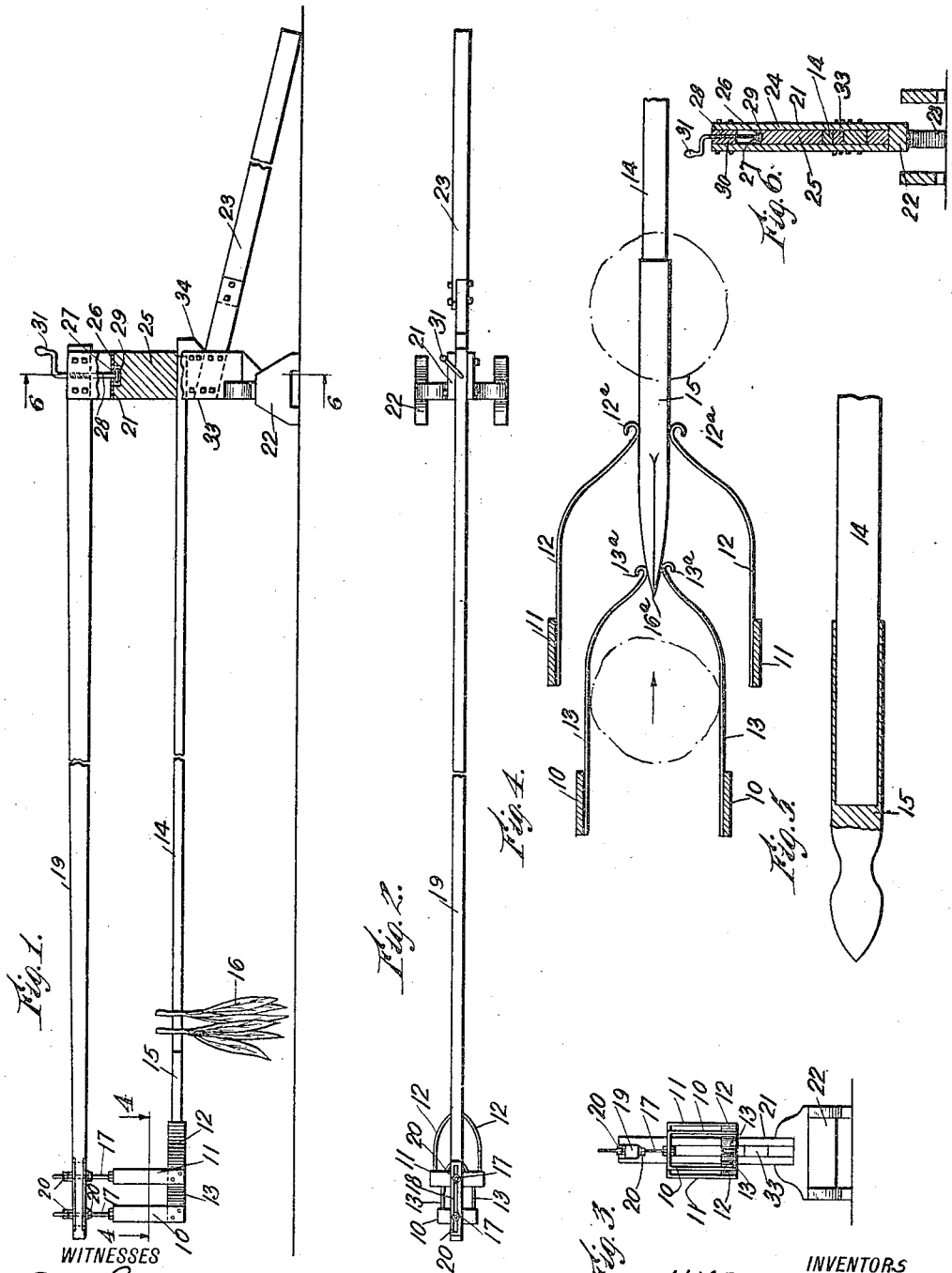

HARVEY M. BOWMAN AND FRANK J. SCHAFFER, OF MEMPHIS, TENNESSEE.

TOBACCO-SPEARER.

1,278,581.  Specification of Letters Patent.  Patented Sept. 10, 1918.

Application filed May 3, 1918. Serial No. 232,369.

*To all whom it may concern:*

Be it known that we, HARVEY M. BOWMAN and FRANK J. SCHAFFER, both citizens of the United States, and both residents of Memphis, in the county of Shelby and State of Tennessee, have invented a new and Improved Tobacco-Spearer, of which the following is a full, clear, and exact description.

Our invention has for its object to provide a tobacco spearer which may be employed for spearing tobacco when harvesting the same, the spearer having two pairs of resilient arms, one pair extending within the other and the terminals of each pair of arms converging to a spear which is detachably mounted on a lath held in place on the frame of the device until the desired amount of tobacco is hung on the lath when the lath may be readily removed from the frame.

Additional objects of the invention will appear in the following specification in which the preferred form of my invention is described.

In the drawings similar reference characters refer to similar parts in all the views, in which—

Figure 1 is a sectional side elevation of the invention;

Fig. 2 is a plan view of Fig. 1;

Fig. 3 is an end view of Fig. 1 looking from the left;

Fig. 4 is an enlarged sectional view on the line 4—4 of Fig. 1;

Fig. 5 is an enlarged sectional fragmentary view illustrating how the spear is mounted on the lath; and Fig. 6 is a sectional view on the line 6—6 of Fig. 1.

By referring to the drawings, it will be seen that there are two inverted U-shaped frame members 10 and 11, the frame member 10 being disposed in front of the frame member 11. Secured to the bottom of the frame member 11 and extending rearwardly therefrom, there are resilient arms 12 which converge rearwardly. In a similar manner resilient arms 13 are secured to the bottom of the inverted U-shaped frame 10 and extend rearwardly within the frame 11.

It will be seen by referring to Fig. 4 of the drawings that the arms of the U-shaped frame member 10 are spaced nearer together than are the arms of the U-shaped frame member 11. Extending forwardly in the direction of the resilient arms 12 and 13, there is a lath 14 on the forward end of which a spear 15 is detachably mounted, this spear extending between the resilient arms 12 with its point 16 normally disposed between the rear ends of the resilient arms 13. The rear ends 12$^a$ of the resilient arms 12 and the rear ends 13$^a$ of the resilient arms 13 are curved rearwardly and outwardly as best illustrated in Fig. 4 of the drawings.

It will be understood that in the use of the spearer, a number of laths 14 are employed, so that when the desired amount of tobacco 16 is hung on a lath 14, it may be removed and another lath 14 may be substituted.

The inverted U-shaped frame members 10 and 11 are supported on bolts 17 which extend through a vertically disposed longitudinal slot 18 at the forward end of an arm 19, nuts 20 being provided for securing the bolts 17 at the desired height and spaced from each other in the slot 18 a predetermined distance apart, so that the inverted U-shaped frames 10 and 11 may be secured to the arm 19 in adjusted position. The rear of this arm 19 is secured to a standard 21 which is mounted on a base 22, and which has a rearwardly extending lug 23 which may be weighted, if desired, to counterbalance the weight of the arm 19 which supports the frames 10 and 11.

In the standard 21 there is a vertical guideway 24 in which a block 25 is adapted to move, a plate 26 being secured to the top of this block 25 and having a bearing 27 in which a screw 28 is disposed. A nut 29 is disposed in an opening in the block 25 and meshes with the screw 28 below the plate 26, so that when the screw 28 is turned in a threaded opening 30, with which it meshes, the block 25 may be raised or lowered, as desired. A crank 31 is secured to the screw 28 by which it may be readily rotated.

The rear end of the lath 14 is disposed in the guideway 24 and when the block 25 is lowered by means of the crank 31, the block 25 presses the rear of the lath 14 against a bed member 33 to secure the rear of the lath and the standard while the tobacco is being hung on the lath. A member 34 at the rear of the standard is disposed in a position to limit the rearward movement of the lath.

Having thus described our invention, we claim as new and desire to secure by Letters Patent:

1. In a tobacco spearer, a standard, an arm extending forwardly from the standard and provided with a longitudinal slot, two inverted U shaped frames disposed one in front of the other and below the arm, supporting means adjustable longitudinally in the slot by which the frames are held in adjusted position relatively to the arm, a lath detachably supported by the standard, two pairs of resilient arms, one pair converging rearwardly from each of the frames, and a spear detachably mounted on the forward end of the lath and extending to the resilient arms.

2. In a tobacco spearer, a standard, an arm extending forwardly from the standard, two inverted U shaped frames depending from the arm, resilient arms secured at their forward ends to the bottom of the U shaped frames and converging rearwardly, a lath detachably supported by the standard and extending in the direction of the U shaped frames, and a spear detachably mounted on the forward end of the lath and extending to the resilient arms.

3. In a tobacco spearer, supporting means, two open depending frames carried by the supporting means, one in front of the other, two pairs of rearwardly converging resilient arms, one pair being mounted on each of the open frames, a lath detachably held relatively to the supporting means in the rear of the resilient arms and extending in the direction thereof, and a spear detachably mounted on the forward end of the lath and extending to the resilent arms.

4. In a tobacco spearer, a standard, an arm extending forwardly from the standard and provided with a vertical slot, two open frames one disposed in front of the other, supporting means adjustable longitudinally in the slot by which the frames are held in adjusted position, a lath detachably supported by the standard, two pairs of resilient arms, one pair converging rearwardly from each of the frames, and a spear detachably mounted on the forward end of the lath and extending to the resilient arms.

5. In a tobacco spearer, an inverted U-shaped frame, resilient arms secured at their forward ends to the bottom of the U-shaped frame and converging rearwardly, a lath disposed at the rear of the U-shaped frame and extending in the direction of the said frame, and a spear detachably mounted on the forward end of the lath with its point adjacent the rear of the resilient arms.

6. In a tobacco spearer, an inverted U-shaped frame, resilient arms secured at their forward ends to the bottom of the U-shaped frame and converging rearwardly, a second inverted U-shaped frame disposed at the rear of the first U-shaped frame, a second pair of resilient arms secured at their forward ends to the bottom of the second U-shaped frame and converging rearwardly, a lath disposed at the rear of the U-shaped frames and extending in the direction thereof, and a spear detachably mounted on the forward end of the lath and extending to the rear ends of the resilient arms.

HARVEY M. BOWMAN.
FRANK J. SCHAFFER.

Witnesses:
 TON M. MOHON,
 M. BROUEN.

Copies of this patent may be obtained for five cents each, by addressing the "Commissioner of Patents, Washington, D. C."